L. HOUCKE.
Coffee Roaster.
No. 110,916.
Patented Jan. 10, 1871.
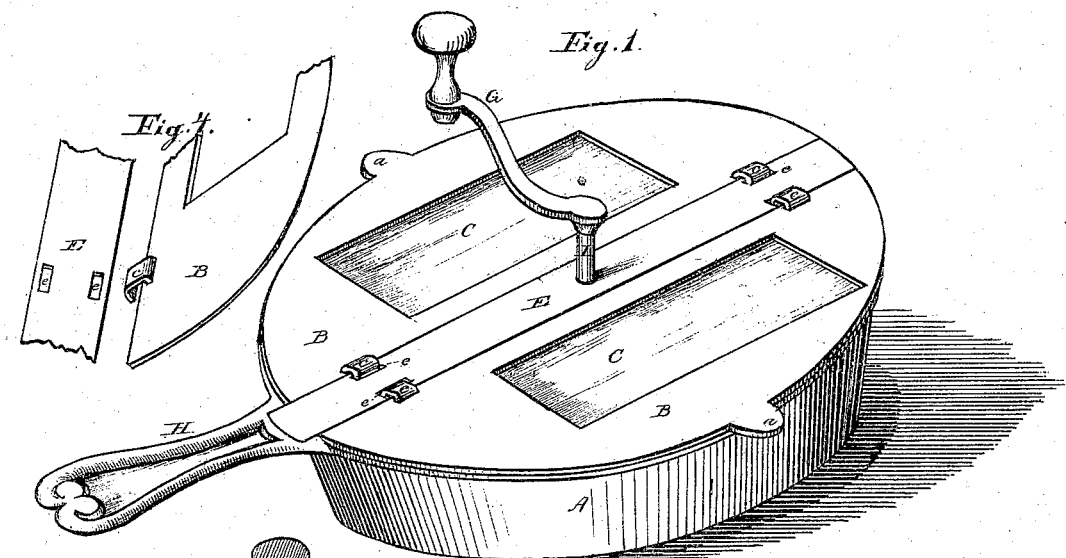
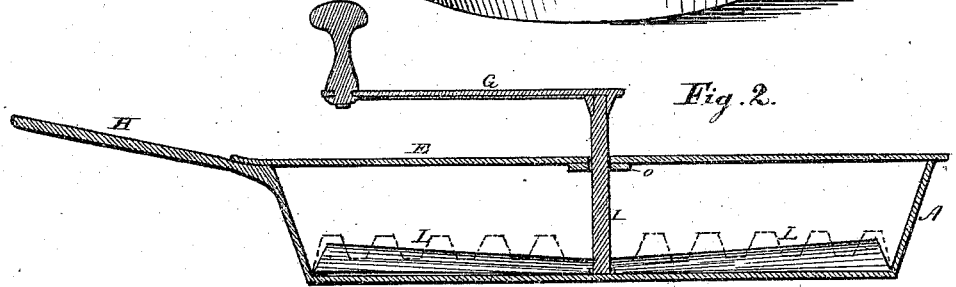
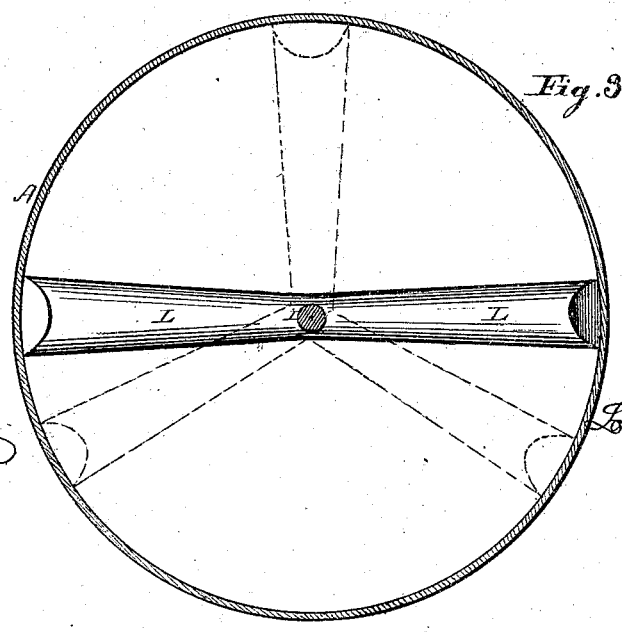
Witnesses:
Phil. T. Dodge
Chas. E. Wilson
Inventor:
Louis Houcke
by
Dodge & Munn
attys

United States Patent Office.

LOUIS HOUCKE, OF SPRINGFIELD, OHIO.

Letters Patent No. 110,916, dated January 10, 1871.

IMPROVEMENT IN COFFEE-ROASTERS.

The Schedule referred to in these Letters Patent and making part of the same.

*To all whom it may concern:*

Be it known that I, LOUIS HOUCKE, of Springfield, in the county of Clark and State of Ohio, have invented certain Improvements in Coffee-Roasters, of which the following is a specification, reference being had to the accompanying drawing.

My invention relates to devices used for roasting coffee, popping corn, and such like purposes; and The invention consists of a cast-iron vessel, having doors, with glass-windows therein, and having a crank with arms attached for stirring the material while cooking, all as hereinafter more fully explained.

Figure 1 is a perspective view of my improved implement complete;

Figure 2 is a transverse vertical section of the same;

Figure 3, a transverse horizontal section; and

Figure 4, a view of a portion detached and more in detail.

To construct my improved implement I first provide a round, flat, or shallow vessel, A, representing a spider in form, as shown in fig. 1.

This may be made of sheet-iron, or similar material, but it can be more cheaply made of cast-iron, and therefore I make it of that material, a handle, H, being cast with the body, as shown in figs. 1 and 2.

Across the center of this vessel A, on its top, I secure a narrow strip or plate, E, having small oblong holes *e* made in it, on each side, near both ends, as shown in fig. 1. I then make two segmental covers B, which are provided with hook-shaped projections *c*, arranged to fit into the holes *e* of the plate E, as shown more clearly in fig. 4, and thus form hinges by which the covers B are attached to the central strip E, so that they can be opened or closed at pleasure.

By this method of constructing the hinges the parts can be united just as they are cast, without any further preparation or finishing, and at the same time the covers can be at once detached whenever desired.

These covers B I make with a large opening in them, and this opening I fill with glass, thus forming windows C in the doors, as represented in fig. 1, so that the operator can at all times see the contents of the vessel without opening the doors or lids.

By this means the aroma of the coffee can be retained, and the operator enabled to watch it, and thus control its roasting or cooking, as desired.

Each of the lids B is provided with a projecting lip, *a*, as shown in fig. 1, by which to open them.

Through the center of the strip E I extend a vertical rod, I, which is held in place by a pin, O, as shown in fig. 2.

To this rod I is secured a crank, G, at its upper end, its lower end being secured to a bar, L, which extends across the bottom of the vessel A, as represented in figs. 2 and 3, thus forming arms for stirring the material.

These arms I make flat on their under surface, and oval or rounding on their upper surface, so that they will lie close upon the flat bottom, and be sure to pass under the kernels, and thus prevent their adhering to the bottom and becoming burned.

It will be observed, also, that these arms are made wider and thicker as they recede from the center toward their outer ends, the object being to counteract their tendency to work or shove the coffee out toward the periphery or sides of the vessel, as would otherwise be the case. There may be three of these arms, as indicated by the dotted lines in fig. 3, or even more, if desired; and they may be made with a notched rib along their upper side, as indicated by the dotted lines in fig. 2, their function being to keep the material thoroughly stirred, so as to prevent burning it, and insure its being evenly cooked or browned.

The bottom of the vessel may be made lowest at its center, to counteract the tendency of the material to work to the outside, but in that case the arms L must be varied in form to correspond.

In making these implements for the market they should be made of a size to fit the holes in the top of ordinary cook-stoves, though it is obvious that they may be made of any required size.

I have designed it more especially for roasting coffee, but it is equally well adapted to popping corn, roasting chestnuts, peanuts, and similar articles, and may be used for any of these purposes.

It is simple, cheap, and efficient, and thus fills a want long felt in households of an implement equally well adapted to a variety of uses of the character mentioned.

Having thus described my invention,

What I claim is—

1. The herein-described coffee-roaster, consisting of the vessel A, provided with the lids B, having the windows C, and hooks *c* thereon, in combination with the crank and arms L, all constructed and arranged to operate substantially as described.

2. The scrapers or arms L, made flat on their under surface, and thicker at their outer ends, arranged for use, in connection with the vessel A, as herein described.

LOUIS HOUCKE.

Witnesses:
JAS. L. TORBERT,
EDW. P. TORBERT.